3,284,502
POLYHALOGENATED PHENYL-DIAMINO PHENYL-ETHERS, SULFIDES, AND SELENIDES
Robert J. Knopf, St. Albans, and Thomas K. Brotherton, Charleston, W. Va., assignors to Union Carbide Corporation, a corporation of New York
No Drawing. Filed Sept. 20, 1963, Ser. No. 310,461
12 Claims. (Cl. 260—571)

This invention relates, in general, to novel polyhalogenated polyamine ethers, sulfides, and selenides and to a process for their preparation. More particularly, this invention relates to a novel class of polyhaloaryl polyaminoaryl ethers, sulfides, and selenides and to a process for their preparation. In one aspect, this invention relates to a novel sub-class of polyaholaryl diaminoaryl ethers, sulfides, and selenides which are useful in various phases of polyurethane chemistry.

The polyhalogenated polyamine ethers, sulfides, and selenides of this invention are valuable curing agents for polyurethane-type elastomers. They serve as excellent starting materials for polyhalogen-containing polyols, which can be readily prepared from these polyhalogenated polyamines via the addition of alkylene oxides. An important use for the polyhalogenated polyamines of this invention is that of starting materials for the preparation of the corresponding polyhalogenated polyisocyanate ethers, sulfides and selenides, which are of interest in rigid, self-extinguishing polyurethane foam applications, and which form the subject matter of copending application Serial No. 310,461, filed herewith. In all of these applications, the high halogen content of the polyhalogenated polyamines of this invention can be expected to impart greatly improved flame-retardant properties to the finished formulations. In addition, the halogen atoms, i.e., chlorine, bromine, and iodine, in the polyhalogenated polyamines of this invention are extremely stable, relatively inert and unusually resistant to chemical reactions such as hydrolysis, displacement, hydrogenation, and the like.

Accordingly, it is a general object of the present invention to provide novel polyhalogenated polyamine ethers, sulfides, and selenides which are suitable for use in the plastic and resin field. A more specific object is to provide new polyaholaryl polyaminoaryl ethers, sulfides, and selenides containing high percentages of the halogens, chlorine, bromine, and iodine, which are especially useful in preparing the corresponding polyhaloaryl polyisocyanatoaryl flame-proofing agents for use in self-extinguishing polyurethane systems. Another more specific object of this invention is to provide polyhaloaryl polyaminoaryl ethers, sulfides, and selenides which are valuable curing agents for polyurethane-type elastomers. A still further specific object of this invention is to provide polyhaloaryl polyaminoaryl ethers, sulfides, and selenides which must contain on different aryl moieties of the molecule, at least two amino groups and two halogen atoms, as hereinafter defined. Another specific object is to provide novel polyhaloaryl diaminoaryl ethers, sulfides, and selenides which are useful in preparing the corresponding polyhaloaryl diisocyanatoaryl flame-proofing agents for use in self-extinguishing polyurethane systems. A further specific object is to provide a novel process for the preparation of polyhaloaryl polyaminoaryl ethers, sulfides, and selenides. These and other objects will readily become apparent to those skilled in the art to which this invention pertains from the ensuing description of the invention.

In a broad aspect, this invention is directed to a novel class of polyhaloaryl polyaminoaryl ethers, sulfides, and selenides which include, as a particularly preferred subclass, novel polyhaloaryl diaminoaryl ethers, sulfides, and selenides, to be defined more fully hereinafter.

The novel class of polyhaloaryl polyaminoaryl ethers, sulfides, and selenides of this invention can be conveniently looked upon as binary compounds of oxygen, divalent sulfur, and divalent selenium containing respectively, an oxy (—O—), thio (—S—), and seleno (—Se—) linkage between two aryl moieties, one of said moieties containing at least two halogen atoms and the other of said moieties containing at least two amino groups. They also can be looked upon as polyhaloaryl polyaminoaryl ethers, sulfides, and selenides. It is a requirement of the present invention that the halogen atoms must be in one aryl ring, and the amino groups in the other aryl ring. It is a further requirement of this invention that there be at least two halogen atoms in one aryl ring and at least two amino groups in the other aryl ring. The halogen atoms and the amino groups must not be in the same aryl ring. The halogen atoms and the amino groups can occupy any position in their respective aryl rings without regard to problems of steric hinderance involving the oxy, thio, or seleno linkage. Positions ortho to the oxy, thio, or seleno linkage in each aryl ring can be substituted with their respective halogen atoms or amino groups as provided herein. In their respective rings, the halogen atoms and amino groups can be meta, ortho, or para to each other. In a preferred form, the amino groups are meta to each other.

The novel class of polyhaloaryl polyamino aryl ethers, sulfides, and selenides of this invention can be conveniently represented by Formula I:

(I) 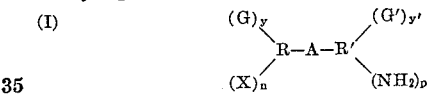

wherein A is either an oxy (—O—), thio (—S—), or seleno (—Se—) radical; R and R' both are aryl radicals; X is either chlorine, bromine, or iodine; G and G' are either alkyl, alkoxyl, cyano, carbalkoxy, hydroxyl, mercapto, carboxyl, or like groups; $n$ and $p$ are each positive whole numbers or integers of at least 2 whose upper limit is equal to the number of hydrogen atoms present on the unsubstituted parent groups R and R'; $y$ and $y'$ each can be zero or any positive whole number or integer whose sum does not exceed the number of positions which would normaly be occupied by hydrogen atoms in the unsubstituted parent groups R and R', minus the value of $n$ and $p$.

Illustrative of maximum values for $n$ or $p$ are: 5 when R and R' are both phenyl; 7 when R and R' are both naphthyl; 9 when R and R' are both anthryl or phenanthryl; 5 for n when R is phenyl and 7 for $p$ when R' is naphthyl; and so forth. The sums of $y$, $y'$, $n$ and $p$ must not exceed the number of positions which would normally be occupied by hydrogen atoms in the unsubstituted parent groups R and R', with the proviso that both $n$ and $p$ each must have a value of at least 2. All the above variables and whole numbers can be the same or different, with any combination thereof permissible within the terms of the aforementioned limits and proviso.

Preferred members of the novel class of polyhaloaryl polyaminoaryl ethers, sulfides, and selenides represented by Formula I) are those wherein A is either an oxy (—O—), thio (—S—), or seleno (—Se—) radical; R and R' are each aryl from 6 to 14 carbon atoms; X is either chlorine, bromine, or iodine; n and p are each a positive whole number of from 2 to 9, inclusive; and $y$ and $y'$ are each zero. Particularly preferred members of the aforementioned novel class of polyhaloaryl polyaminoaryl ethers, sulfides, and selenides represented by Formula I are those wherein A is an oxy (—O—) radical; R and R′ are each aryl of from 6 to 14 carbon atoms; X is either chlorine, bromine, or iodine; n and p each have a value of from 2 to 9, inclusive; and y and y′ are each zero.

The most preferred polyhaloaryl polyaminoaryl ethers, sulfides, and selenides of this invention are those of the sub-class polyhaloaryl diaminoaryl ethers, sulfides, and selenides which can be represented by Formula II:

(II) 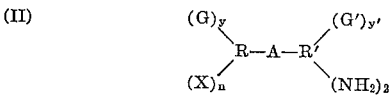

wherein A is either an oxy (—O—), thio (—S—), or seleno (—Se—) radical; R and R′ are each aryl of from 6 to 14 carbon atoms; X is chlorine, bromine, or iodine; G and G′ are each either alkyl, alkoxyl, cyano, hydroxyl, carbalkoxy, mercapto, carboxyl, or like groups; n is a positive whole number of from 2 to 9, inclusive; and y and y′ each can be zero or any positive whole number from 1 to 7, inclusive. A preferred group of polyhaloaryl diaminoaryl ethers, sulfides, and selenides represented by Formula II are those wherein A is an oxy (—O—), thio (—S—), or seleno (—Se—) radical; R and R′ are each aryl of from 6 to 14 carbon atoms; X is chlorine, bromine, or iodine; n is a positive whole number of from 2 to 9; inclusive; y and y′ are both zero. Particularly preferred polyhaloaryl diaminoaryl ethers, sulfides, and selenides represented by Formula II are those of Formula III:

(III) 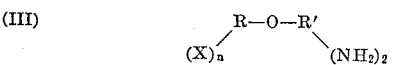

wherein R and R′ are each aryl of from 6 to 14 carbon atoms; X is chlorine, bromine, or iodine, and n has a value of from 2 to 9, inclusive. The most preferred polyhaloaryl diaminoaryl ethers, sulfides, and selenides of this invention, and represented by Formula III, are those wherein R and R′ are each phenyl or naphthyl, especially phenyl; X is chlorine, bromine, or iodine, especially chlorine and bromine; and n has a value of from 2 to 7, inclusive.

Representative polyhaloaryl polyaminoaryl ethers, sulfides, and selenides encompassed within this invention include, among others, 2,4,6-trichlorophenyl 2,4-diaminophenyl ether;
2,6-dichlorophenyl 2,4-diaminophenyl ether;
2,3-diiodophenyl 2,4-diaminophenyl sulfide;
3,4-dichlorophenyl 2,4-diaminophenyl ether;
pentachlorophenyl 2,6-diaminophenyl ether;
2,4-dibromo-6-hydroxyphenyl 2,4,6-triaminophenyl ether;
4,6-dichloro-2-methoxyphenyl 2,4-daminophenyl ether;
2,3-dibromo-4,6-dicyanophenyl 2,6-diaminophenyl ether;
pentachlorophenyl 2,5-diaminophenyl selenide;
2,4-dichloro-6-cyanophenyl 2,4-diaminophenyl ether;
2,4-diiodo-3-methoxyphenyl 2,4,6-triaminophenyl ether;
2,4-dibromo-6-methylphenyl 2,4,6-triaminophenyl ether;
2,4,6-triiodophenyl 2,4,6-triaminophenyl ether;
2,4,6-tribromophenyl 2,4-diaminophenyl sulfide;
2,4,6-triiodo 2,4,6-triaminophenyl selenide;
4,7-dichloro-β-naphthyl 2,4,6-triamonophenyl selenide;
5,7-dibromo-β-naphthyl 2,4-dibromo-6,8-diamino-8-naphthyl ether;
pentachlorophenyl 2,4-diaminophenyl selenide;
2,4,6-trichlorophenyl 1,6-diamino-β-anthryl ether;
pentachlorophenyl 2,4,6-triaminophenyl ether;
pentachlorophenyl 2,4,6-triaminophenyl sulfide;
pentachlorophenyl 2,4,6-triaminophenyl selenide;
pentabromophenyl 2,6-diaminophenyl ether;
pentachlorophenyl 2,4-diamino-6-mercaptophenyl ether;
2,4-dichloro 2,4-diamino-5-mercaptophenyl ether;
2,4,6-tribromphenyl 2,3-diamino-6-hydroxyphenyl ether;
pentachlorophenyl 2,4-diamino-6-cyanophenyl ether;
pentachlorophenyl 2,3-diamino-4-carboxyphenyl ether;
pentachlorophenyl 2,4-diamino-5-carbethoxyphenyl ether;
and the like.

The polyhaloaryl diaminoaryl ethers, sulfides, and selenides represented by Formula II, are the preferred sub-class of this invention, and additional representative members are:

pentachlorophenyl 2,4-diaminophenyl ether;
pentachlorophenyl 2,6-diaminophenyl ether;
pentachlorophenyl 5,6-diaminophenyl ether;
pentachlorophenyl 3,4-diaminophenyl ether;
pentachlorophenyl 2,3-diaminophenyl ether;
pentachlorophenyl 2,4-diaminophenyl sulfide;
pentachlorophenyl 2,4-diaminophenyl selenide;
pentabromophenyl 2,4-diaminophenyl ether;
pentabromophenyl 2,4-diaminophenyl sulfide;
pentabromophenyl 2,4-diaminophenyl selenide;
pentachlorophenyl 1,6-diamino-β-naphthyl ether;
pentachlorophenyl 1,6-diamino-β-naphthyl sulfide;
pentachlorophenyl 1,6-diamino-β-naphthyl selenide;
pentabromophenyl 1,6-diamino-β-naphthyl ether;
pentabromophenyl 1,6-diamino-β-naphthyl sulfide;
pentabromophenyl 1,6-diamino-β-naphthyl selenide;
pentachlorophenyl 1,6-diamino-β-anthryl ether;
pentachlorophenyl 1,6-diamino-β-anthryl sulfide;
pentachlorophenyl 1,6-diamino-β-anthryl selenide;
2,4,6-tribromophenyl 2,4-diaminophenyl ether;
2,4,6-tribromophenyl 2,4-diaminophenyl sulfide;
2,4,6-tribromophenyl 2,4-diaminophenyl selenide;
4,7-dibromo-β-naphthyl 2,4-diaminophenyl ether;
4,7-dibromo-β-naphthyl 2,4-diaminophenyl sulfide;
4,7-dibromo-β-naphthyl 2,4-diaminophenyl selenide;
2,4-diiodophenyl 2,4-diaminophenyl ether;
2,4-diiodophenyl 2,4-diaminophenyl sulfide;
2,4-diiodophenyl 2,4-diaminophenyl selenide;
2,3,4-trichlorophenyl 2,6-diaminophenyl ether;
4,5,6-tribromophenyl 3,4-diaminophenyl sulfide;
2,4,6-triiodophenyl 2,6-diaminophenyl selenide;
2,4-dichloro-6-methylphenyl 2,4-diaminophenyl ether;
2,4-dichloro-5-hydroxylphenyl 2,6-diaminophenyl ether;
2,4-dibromo-6-methoxyphenyl 2,5-diaminophenyl ether;
2,6-dichloro-5-carboxyphenyl 2,6-diamino-4-carbethoxyphenyl ether;
4,7-dichloro-β-naphthyl 4,7-diamino-β-naphthyl ether;
4,7-dichloro-β-naphthyl 4,7-diamino-β-naphthyl sulfide;
4,7-dichloro-β-naphthyl 4,7-diamino-β-naphthyl selenide;
2,3,4,5,6,7,8-heptachloro-α-naphthyl 1,6-diamino-β-naphthyl ether;
2,3,4,5,6,7,8-heptachloro-α-naphthyl 1,6-diamino-β-naphthyl sulfide;
2,3,4,5,6,7,8-heptachloro-α-napthyl 1,6-diamino-β-naphthyl selenide;
6,7,8,9-tetrachloro-β-anthryl 1,6-diamino-β-anthryl ether;
6,7,8,9-tetrachloro-β-anthryl 1,6-diamino-β-anthryl sulfide;
6,7,8,9-tetrachloro-β-anthryl 1,6-diamino-β-anthryl selenide;

and the like.

In general, the polyhaloaryl polyaminoaryl ethers, sulfides, and selenides of this invention can be prepared from relatively inexpensive, commercially available materials. They are most conveniently prepared by the reduction of their corresponding nitro precursors.

Briefly, the polyhaloaryl polyaminoaryl ethers, sulfides, and selenides of this invention are obtained from the corresponding polyhaloaryl polynitroaryl ethers, sulfides, and selenides by chemical or catalytic reduction, e.g., with iron and acid, or by catalytic hydrogenation. The polyhaloaryl polynitroaryl precursors can be obtained by polynitro-arylation of the appropriate polyhalophenols, naphthols, anthrols, and phenanthrols, and the corresponding thiols and selenols, by reaction with a polynitrohalobenzene, naphthalene, anthracene or phenanthracene, in the presence of an alkali.

The novel process of this invention involves formation of amines by reduction of the polyhaloaryl polynitroaryl precursor to the corresponding polyhaloaryl polyaminoaryl compound. This reduction can be accomplished in a variety of ways, such as, with iron and acid, zinc or iron in strong alkaline solution, zinc in weak alkaline solution, sulfides in alkaline solution, ferrous sulfate in alkaline solution, sodium hydrosulfite (hyposulfite) in alkaline solution, stannous chloride, by catalytic hydrogenation using, e.g., Adams catalyst in the presence of molecular hydrogen, or Raney nickel and hydrogen, or by electrolytic methods.

The most preferred process for the preparation of the polyhalogenated polyaminoaryls of this invention is the reduction of the corresponding polynitro precursor with either Adams catalyst (platinum oxide) in the presence of molecular hydrogen or with metallic tin in the presence of a strong acid such as hydrochloric or sulfuric acid.

When using Adams catalyst, the amount of catalyst by weight can range from about 0.01 percent to about 10 percent, with from about 0.5 percent to about 4 percent preferred. The temperature can range from about 0° C. to about 50° C., with from about 20° C. to about 40° C. preferred. The hydrogen pressure can range from about 1 atmosphere to about 10 atmospheres or higher, with from about 1 atmosphere to about 5 atmospheres, preferred.

When using metallic tin and acid, mossy tin metal and hydrochloric acid are preferred. In order to assure complete reaction in theory, three gram atoms of tin and six gram equivalents of hydrogen ion (acid) per gram equivalent of nitro group are necessary. An excess of tin and mineral acid are used to assure optimum reduction of the nitro groups. The excess of the aforementioned reagents is limited only by practical considerations of economy and ease of handling. The temperature can range from about 10° C. to about 50° C., with from about 20° C. to about 50° C. preferred. The pressure is in no way critical and can be superatmospheric, atmospheric or subatmospheric.

For illustrative purposes only, the polyhaloaryl diaminoaryl ethers such as the polyhalophenyl diaminophenyl ethers, can be derived from relatively inexpensive, commercially available polyhalophenols, such as pentachlorophenol, pentabromophenol, tribromophenol, and a 2,4-dinitrohalobenzene. The polyhalophenols are reacted with a 2,4-dinitrohalobenzene in the presence of alkali to form a polyhalophenyl 2,4-dinitrophenyl ether, which upon either catalytic or chemical reduction affords the corresponding polyhalophenyl 2,4-diaminophenyl ether.

A typical reaction sequence utilized in the preparation of the compounds of this invention is as follows:

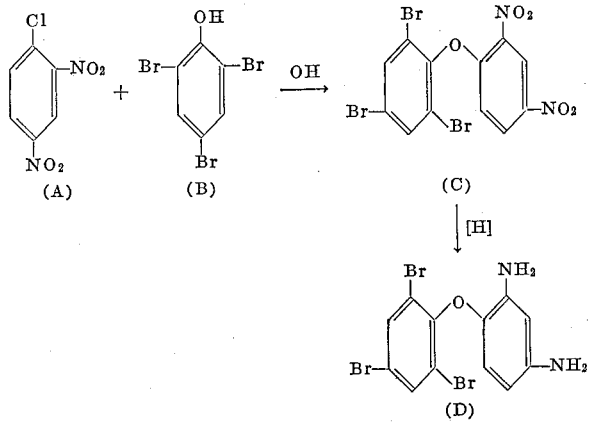

In the above reaction sequence 2,4-dinitrochlorobenzene (A) is reacted with 2,4,6-tribromophenol (B) in the presence of alkali to form 2,4,6-tribromophenyl 2,4-dinitrophenyl ether (C) which upon reduction affords the corresponding 2,4,6-tribromophenyl 2,4-diaminophenyl ether (D).

In general, the polyhaloaryl polynitroaryl ethers, sulfides, and selenides used as starting materials for the polyhaloaryl polyaminoaryls of this invention can be represented by Formula IV:

(IV) 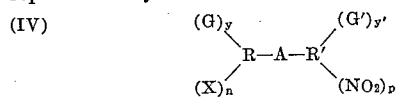

wherein $A$, $R$, $R'$, $X$, $G$, $G'$, $n$, $y$, $y'$, and $p$ are as defined with reference to Formula I.

The most preferred polyhaloaryl polyaminoaryl ethers, sulfides, and selenides of this invention, that is, those of the sub-class polyhaloaryl diaminoaryl ethers, sulfides, and selenides represented by Formula II, can be prepared from polyhaloaryl dinitroaryl precursors of Formula V:

(V) 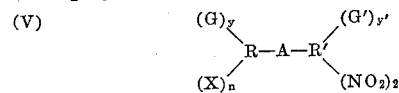

wherein $A$, $R$, $R'$, $X$, $G$, $G'$, $n$, $y$, and $y'$ are defined with reference to Formula II. Particularly preferred polyhaloaryl diaminoaryl ethers, sulfides, and selenides represented by Formula III can be prepared from the corresponding polyhaloaryl dinitroaryl precursors of Formula VI:

(VI) 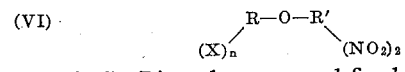

wherein $R$, $R'$, and $n$ are as defined with reference to Formula III.

Representative starting polyhaloaryl polynitroaryl ethers, sulfides, and selenides which can be used to prepare the polyhaloaryl polyaminoaryl ethers, sulfides, and selenides of this invention are, among others, 2,4-dichloro-6-cyanophenyl 2,4-dinitrophenyl ether;
2,4-diiodo-3-methoxyphenyl 2,4,6-trinitrophenyl ether;
2,4-dibromo-6-methylphenyl 2,4,6-trinitrophenyl ether;
2,4,6-triiodophenyl 2,4,6-trinitrophenyl ether;
2,4,6-tribromophenyl 2,4-dinitrophenyl sulfide;
2,4,6-triiodo 2,4,6-trinitrophenyl selenide;
4,7-dichloro-β-naphthyl 2,4,6-trinitrophenyl selenide;
5,7-dibromo-β-naphthyl 2,4-dibromo-6,8-dinitro-α-naphthyl ether;
pentachlorophenyl 2,4-dinitrophenyl ether;
pentachlorophenyl 2,4-dinitrophenyl sulfide;
pentachlorophenyl 2,4-dinitrophenyl selenide;
pentabromophenyl 2,4-dinitrophenyl ether;
pentabromophenyl 2,4-dinitrophenyl sulfide;
pentabromophenyl 2,4-dinitrophenyl selenide;
pentachlorophenyl 1,6-dinitro-β-napthyl ether;
pentachlorophenyl 1,6-dinitro-β-napthyl sulfide;
pentachlorophenyl 1,6-dinitro-β-naphthyl selenide;
pentabromophenyl 1,6-dinitro-β-naphthyl ether;
pentabromophenyl 1,6-dinitro-β-naphthyl sulfide;
pentabromophenyl 1,6-dinitro-β-naphthyl selenide;
pentachlorophenyl 1,6-dinitro-β-anthryl ether;
pentachlorophenyl 1,6-dinitro-β-anthryl sulfide;
pentachlorophenyl 1,6-dinitro-β-anthryl selenide;
2,4,6-tribromophenyl 2,4-dinitrophenyl ether;
2,4,6-tribromophenyl 2,4-dinitrophenyl sulfide;
2,4,6-tribromophenyl 2,4-dinitrophenyl selenide;
4,7-dibromo-β-naphthyl 2,4-dinitrophenyl ether;
4,7-dibromo-β-naphthyl 2,4-dinitrophenyl sulfide;
4,7-dibromo-β-naphthyl 2,4-dinitrophenyl selenide;
2,4-diiodophenyl 2,4-dinitrophenyl ether;
2,4-diiodophenyl 2,4-dinitrophenyl sulfide;
2,4-diiodophenyl 2,4-dinitrophenyl selenide;
4,7-dichloro-β-naphthyl 4,7-dinitro-β-naphthyl ether;
4,7-dichloro-β-naphthyl 4,7-dinitro-β-naphthyl sulfide;
4,7-dichloro-β-naphthyl 4,7-dinitro-β-naphthyl selenide;
2,3,4,5,6,7,8-heptachloro-α-naphthyl 1,6-dinitro-β-naphthyl ether;
2,3,4,5,6,7,8-heptachloro-α-naphthyl 1,6-dinitro-β-naphthyl sulfide;
2,3,4,5,6,7,8-heptachloro-α-naphthyl 1,6-dinitro-β-naphthyl selenide;

6,7,8,9-tetrachloro- -anthryl 1,6-dinitro- -anthryl ether;
6,7,8,9-tetrachloro- -anthryl 1,6-dinitro- -anthryl sulfide;
6,7,8,9-tetrachloro- -anthryl 1,6-dinitro- -anthryl selenide;
and the like.

The following examples are illustrative of the polyhalogenated polyamines of this invention and their preparation.

EXAMPLE I

*Pentachlorophenyl 2,4-diaminophenyl ether.*—To a laboratory size Parr-type rocking hydrogenator was charged a mixture of 22 g. pentachlorophenyl 2,4-dinitrophenyl ether, 200 cc. methanol and 0.75 g. platinum oxide. At an initial hydrogen pressure of 30 p.s.i.g. and an initial temperature of 25° C., a total of 12 pounds of hydrogen was taken up. The product was methanol insoluble, necessitating the addition of sufficient pyridine to dissolve the material and thereby to permit removal of the catalyst by filtration. Addition of water to the filtrate reprecipitated the diamine. The crude pentachlorophenyl 2,4-diaminophenyl ether product (19 g., quantitative yield) melted at 199–201° C. with decompositions. One recrystallization from ethanol afforded buff-colored needles, M.P. 210° C. (dec.).

*Analysis.*—Calc. for $C_{12}H_7N_2Cl_5O$: C, 38.65; H, 1.88; N, 7.52. Found: C, 38.60; H, 1.83; N, 7.40.

EXAMPLE II

*2,4,6-tribromophenyl 2,4-diaminophenyl ether.*—To a 3-necked glass kettle equipped with a stirrer, reflux condenser and thermometer was charged a mixture of 16.65 g. 2,4,6-tribromophenyl 2,4-dinitrophenyl ether, 20.0 g. of mossy tin metal and 300 cc. of 10 percent hydrochloric acid. The mixture was heated gently at reflux until the tin had completely dissolved. After cooling, a solid product was collected by filtration, washed with water and alcohol, and dried. The dry solid was subsequently triturated with a mixture of 180 cc. of ethanol and 20 cc. of 33 percent aqueous potassium hydroxide. The solid product remaining was collected by filtration and extracted three times with 100 cc. portions of hot ethanol. The extracts were subsequently combined with the original filtrate from trituration and the entire solution was evaporated to dryness under vacuum. The solid remaining from evaporation was suspended in water, filtered and dried to give 14.0 g. (95.5 percent yield) of crude tribromophenyl 2,4-diaminophenyl ether product which crystallized from boiling ethanol as shining, buff-colored plates, M.P. 191–193° C. (dec.).

*Analysis.*—Calc. for $C_{12}H_9N_2OBr_3$: C, 32.95; H, 2.06; N, 6.41; Br, 54.93. Found: C, 32.82; H, 2.11; N, 6.46; Br, 55.78.

EXAMPLE III

*Pentabromophenyl 2,4-diaminophenyl ether.*—In the same manner described in Example II, 7.32 g. of pentabromophenyl 2,4-dinitrophenyl ether were reduced with 6.67 g. of mossy tin metal and 100 cc. of 10 percent hydrochloric acid. When the tin had completely dissolved, the charge was cooled and filtered. The solid product (5.85 g.) was treated with a vigorously agitated mixture of 150 cc. tetrahydrofuran and 10 cc. of 33 percent aqueous potassium hydroxide. The resulting solution was evaporated to dryness, the solid suspended in water, filtered and dried. The yield of light brown solid pentabromophenyl 2,4-diaminophenyl ether, M.P. 219–222° C. (dec.), was 5.1 g. (76.7 percent). Recrystallization from aqueous tetrahydrofuran raised the melting point to 222–223° C. (dec.).

*Analysis.*—Calc. for $C_{12}H_7N_2OBr_5$: C, 24.20; H, 1.18; N, 4.71. Found: C, 24.65; H, 1.31; N, 5.02.

EXAMPLE IV

*Pentachlorophenyl 1,6-diamino-β-naphthyl ether.*—In a manner similar to the preparation of the diamine of Example II, pentachlorophenyl 1,6-diamino-β-naphthyl ether is obtained from pentachlorophenyl 1,6-dinitro-β-naphthyl ether.

EXAMPLE V

*Pentachlorophenyl 1,6-diamino-β-anthryl ether.*—In a manner similar to the preparation of the diamine of Example II, pentachlorophenyl 1,6-diamino-β-anthryl ether is obtained from pentachlorophenyl 1,6-dinitro-β-anthryl ether.

EXAMPLE VI

*4,7-dibromo-β-naphthyl 2,4-diaminophenyl sulfide.*—In a manner similar to the preparation of the diamine of Example II, 4,7-dibromo-β-naphthyl 2,4-diaminophenyl sulfide is obtained from 4,7-dibromo-β-naphthyl 2,4-dinitrophenyl sulfide.

EXAMPLE VII

*2,4-diiodophenyl 2,4-diaminophenyl ether.*—In a manner similar to the preparation of the diamine of Example II, 2,4-diiodophenyl 2,4-diaminophenyl ether is obtained from 2,4-diiodophenyl 2,4-dinitrophenyl ether.

EXAMPLE VIII

*Pentachlorophenyl 2,4-diaminophenyl sulfide.*—In a manner similar to the preparation of the diamine of Example II, pentachlorophenyl 2,4-diaminophenyl sulfide is obtained from pentachlorophenyl 2,4-dinitrophenyl sulfide.

EXAMPLE IX

*Pentachlorophenyl 2,4-diaminophenyl selenide.*—In a manner similar to the preparation of of the diamine of Example II, pentachlorophenyl 2,4-diaminophenyl selenide is obtained from pentachlorophenyl 2,4-dinitrophenyl selenide.

Those skilled in the art will readily recognize that other polyhalogenated polyamines encompassed within this invention can be prepared as disclosed in the aforementioned examples.

In general, the polyhaloaryl polyaminoaryl ethers, sulfides, and selenides which have a maximum number of halogen atoms on the aryl ring are preferred compounds of this invention for use in preparing the corresponding polyhaloaryl polyisocyanatoaryl ethers, sulfides, and selenides which are used in preparing self-extinguishing polyurethane systems, since they possess greater flame-retardant properties. It has been found that with increased halogen content of the aryl ring there is a corresponding increase in flame-retardant properties, with maximum flame-retardant properties occuring with maximum halogen content.

Although this invention has been illustrated by the preceding examples, it is not to be construed as limited to the materials employed therein, but rather, this invention encompasses the broad class of polyhaloaryl polyaminoaryl compounds as hereinbefore disclosed. Various modifications and embodiments of this invention can be made without departing from the spirit and scope thereof.

What is claimed is:

1. Polyhalogenated polyamines of the formula:

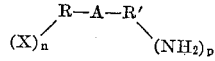

wherein A is selected from the group consisting of oxy (—O—), thio (—S—), and seleno (—Se—) radicals; R and R' are each aryl of from 6 to 14 carbon atoms; X is selected from the group consisting of chlorine, bromine, and iodine; and $n$ and $p$ are each integers of at least 2, whose upper limit is equal to the number of hydrogen atoms present in the unsubstituted aryl groups R and R'.

2. Polyhalogenated polyamines of the formula:

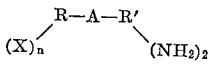

wherein A is selected from the group consisting of oxy (—O—), thio (—S—), and seleno (—Se—) radicals; R and R' are each aryl of from 6 to 14 carbon atoms; X is selected from the group consisting of chlorine, bromine, and iodine; and n is an integer of from 2 to 9, inclusive.

3. Polyhalogenated polyamines of the formula:

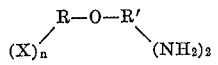

wherein R and R' are each aryl of from 6 to 14 carbon atoms; X is selected from the group consisting of chlorine, bromine, and iodine; and n is an integer of from 2 to 9, inclusive.

4. Pentachlorophenyl 2,4-diaminophenyl ether.
5. 2,4,6-tribromophenyl 2,4-diaminophenyl ether.
6. Pentabromophenyl 2,4-diaminophenyl ether.
7. Pentachlorophenyl 1,6-diamino-β-naphthyl ether.
8. Pentachlorophenyl 1,6-diamino-β-anthryl ether.
9. 4,7-dibromo-β-naphthyl 2,4-diaminophenyl ether.
10. 2,4-diiodophenyl 2,4-diaminophenyl ether.
11. Pentachlorophenyl 2,4-diaminophenyl sulfide.
12. Pentachlorophenyl 2,4-diaminophenyl selenide.

References Cited by the Examiner

UNITED STATES PATENTS 2,765,341  10/1956  Wirth et al. _____ 260—571
3,133,086  5/1964   Bossard et al. ____ 260—571 X

OTHER REFERENCES

Barry et al., Nature (London), 1947, volume 160, pp. 800–801.

Gilman et al., Journal of American Chemical Society, 1947, volume 69, pp. 2053–7.

Kharasch et al., Journal of Organic Chemistry, 1956, vol. 21, number 9, pp. 925–928 (p. 926 relied on).

Wagner et al., Synethetic Organic Chemistry, 1953, pp. 654–655.

CHARLES B. PARKER, *Primary Examiner.*

JOSEPH P. BRUST, D. R. MAHANAND,
*Assistant Examiners.*